United States Patent
Banerjee et al.

(10) Patent No.: US 10,713,038 B2
(45) Date of Patent: *Jul. 14, 2020

(54) TRANSPARENT MULTI-ARCHITECTURE SUPPORT IN A CONTAINER BASED CLOUD

(71) Applicant: International Business Machines Corporation, Armonk, NY (US)

(72) Inventors: Pradipta K. Banerjee, Bangalore (IN); Vaidyanathan Srinivasan, Bangalore (IN)

(73) Assignee: International Business Machines Corporation, Aromonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/213,471

(22) Filed: Jul. 19, 2016

(65) Prior Publication Data
US 2017/0161062 A1 Jun. 8, 2017

Related U.S. Application Data

(63) Continuation of application No. 14/958,490, filed on Dec. 3, 2015.

(51) Int. Cl.
*G06F 8/76* (2018.01)
*G06F 11/36* (2006.01)
(Continued)

(52) U.S. Cl.
CPC .................. *G06F 8/76* (2013.01); *G06F 8/47* (2013.01); *G06F 8/60* (2013.01); *G06F 11/302* (2013.01);
(Continued)

(58) Field of Classification Search
CPC .......... G06F 8/63–64; G06F 8/72; G06F 8/76; G06F 8/47; G06F 8/60; G06F 11/302;
(Continued)

(56) References Cited

U.S. PATENT DOCUMENTS

| | | | | |
|---|---|---|---|---|
| 5,428,782 A | * | 6/1995 | White | G06F 8/38 718/101 |
| 6,442,749 B1 | * | 8/2002 | Hirao | G06F 8/24 717/170 |

(Continued)

OTHER PUBLICATIONS

David Bernstein, "Containers and cloud: From lxc to docker to kubernetes",—IEEE Cloud Computing, 2014, pp. 81-84 (Year: 2014).*

(Continued)

*Primary Examiner* — Ziaul A Chowdhury
*Assistant Examiner* — Zheng Wei
(74) *Attorney, Agent, or Firm* — Mark Bergner (57) ABSTRACT

Adjusting runtime performance includes receiving a first input file of a software application, where the software application utilizes a first software architecture. Embodiments include analyzing the first input file, including identifying dependencies for a secondary platform. Embodiments include identifying dependencies for the first software architecture, and a first set of code transformation rules based on the identified dependencies. Embodiments include generating code, based on the first set of transformation rules, where the runtime profile contains data regarding first characteristics of the first input file, the generated code allowing the first input file to utilize the second software architecture. Embodiments include identifying a second set of code transformation rules based on the identified dependencies. Embodiments include analyzing, the first input file and identifying problems that may require code changes in order to allow porting of the first input file to the second software architecture.

4 Claims, 9 Drawing Sheets

(51) Int. Cl.
  *G06F 8/41* (2018.01)
  *G06F 11/30* (2006.01)
  *G06F 11/34* (2006.01)
  *G06F 8/60* (2018.01)
(52) U.S. Cl.
  CPC .......... *G06F 11/34* (2013.01); *G06F 11/3466* (2013.01); *G06F 11/3604* (2013.01); *G06F 11/3612* (2013.01); *G06F 2201/865* (2013.01)
(58) Field of Classification Search
  CPC .. G06F 11/34; G06F 11/3466; G06F 11/3604; G06F 11/3612
  See application file for complete search history.

(56) References Cited

U.S. PATENT DOCUMENTS

| | | | | |
|---|---|---|---|---|
| 6,526,570 | B1* | 2/2003 | Click, Jr. | G06F 8/76 717/140 |
| 7,428,733 | B2* | 9/2008 | Woollen | G06F 8/61 717/177 |
| 7,454,660 | B1* | 11/2008 | Kolb | G06F 11/3414 714/38.14 |
| 7,581,224 | B2* | 8/2009 | Romero | G06F 11/3409 709/201 |
| 7,634,721 | B1* | 12/2009 | Labrecque | G06F 8/24 715/234 |
| 8,522,209 | B2* | 8/2013 | Wintergerst | G06F 11/3466 717/124 |
| 8,615,744 | B2* | 12/2013 | Ben-Artzi | G06F 8/51 717/137 |
| 8,819,636 | B2* | 8/2014 | Nagoria | G06F 11/2289 717/125 |
| 8,839,222 | B1* | 9/2014 | Brandwine | G06F 11/3668 717/168 |
| 8,930,905 | B2* | 1/2015 | Lee | G06F 11/3668 717/121 |
| 9,164,859 | B2* | 10/2015 | Rivera Trevino | G06F 11/263 |
| 9,170,808 | B2* | 10/2015 | Sethi | G06F 8/36 |
| 9,459,862 | B2* | 10/2016 | Araya | G06F 8/76 |
| 9,465,608 | B2* | 10/2016 | Araya | G06F 8/447 |
| 9,612,815 | B1 | 4/2017 | Jagtap | G06F 8/61 |
| 9,619,371 | B2* | 4/2017 | Adderly | G06F 11/3664 |
| 9,740,593 | B2* | 8/2017 | Boxall | G06F 8/70 |
| 9,916,233 | B1* | 3/2018 | Qureshi | G06F 11/3692 |
| 9,977,673 | B1* | 5/2018 | Friedkin | G06F 8/76 |
| 10,063,453 | B1* | 8/2018 | Ur | H04L 43/12 |
| 2003/0009747 | A1* | 1/2003 | Duran | G06F 8/76 717/137 |
| 2005/0022185 | A1* | 1/2005 | Romero | G06F 11/3409 718/100 |
| 2005/0108692 | A1* | 5/2005 | Lau | G06F 8/76 717/136 |
| 2005/0257217 | A1* | 11/2005 | Woollen | G06F 8/61 717/177 |
| 2006/0271925 | A1* | 11/2006 | Schuelein | G06F 8/65 717/168 |
| 2008/0178174 | A1* | 7/2008 | Woolen | G06F 8/61 717/177 |
| 2008/0209275 | A1* | 8/2008 | Kwan | G06F 11/3688 714/38.14 |
| 2008/0222616 | A1* | 9/2008 | Cheng | G06F 8/51 717/137 |
| 2008/0301170 | A1* | 12/2008 | Laddha | G06F 11/3419 |
| 2009/0204851 | A1* | 8/2009 | Bengtsson | G06F 11/3672 714/38.11 |
| 2010/0287542 | A1* | 11/2010 | Neft | G06F 8/31 717/140 |
| 2011/0321014 | A1* | 12/2011 | Nagoria | G06F 11/2289 717/125 |
| 2012/0072968 | A1* | 3/2012 | Wysopal | G06F 11/3612 726/1 |
| 2012/0131569 | A1* | 5/2012 | Josepher | G06F 8/61 717/174 |
| 2012/0204159 | A1* | 8/2012 | Ben-Artzi | G06F 8/76 717/137 |
| 2012/0233593 | A1* | 9/2012 | Sahoo | G06F 8/61 717/120 |
| 2014/0165046 | A1* | 6/2014 | Lee | G06F 11/3668 717/135 |
| 2014/0215446 | A1 | 7/2014 | Araya et al. | |
| 2014/0282372 | A1 | 9/2014 | Araya et al. | |
| 2014/0289714 | A1* | 9/2014 | Neft | G06F 8/31 717/140 |
| 2015/0082290 | A1* | 3/2015 | Peled | G06F 8/76 717/137 |
| 2015/0113515 | A1* | 4/2015 | Lachambre | G06F 8/60 717/168 |
| 2015/0128105 | A1* | 5/2015 | Sethi | G06F 8/36 717/106 |
| 2015/0256477 | A1* | 9/2015 | Bragstad | H04L 43/04 709/226 |
| 2016/0041823 | A1* | 2/2016 | Ben-Yair | G06F 8/72 717/111 |
| 2016/0041826 | A1* | 2/2016 | Ben-Yair | G06F 8/72 717/110 |
| 2016/0170863 | A1* | 6/2016 | Finnie | G06F 11/3664 717/131 |
| 2016/0203072 | A1* | 7/2016 | Boxall | G06F 8/70 717/128 |
| 2016/0350173 | A1* | 12/2016 | Ahad | G06F 11/3495 |
| 2016/0378451 | A1* | 12/2016 | Walker | G06F 8/52 717/111 |
| 2017/0103014 | A1* | 4/2017 | Segler | G06F 11/34 |
| 2018/0196741 | A1* | 7/2018 | Qureshi | G06F 11/3692 |

OTHER PUBLICATIONS

Xavier et al., Performance Evaluation of Container-based Virtualization for High Performance Computing Environments, published by IEEE 2012, 21st Euromicro International Conference on Parallel, Distributed, and Network-Based Processing, p. 233-240 (Year: 2012).*
Unknown, "Basic BOSH Workflow," BOSH docs, http://bosh.io/docs/workflow.html, 3 pages, (printed Jun. 19, 2015).
Unknown, "About Docker," Docker Documentation, http://docs.docker.com/v1.2/, 3 pages, (printed Jun. 19, 2015).
Mell et al., "The NIST Definition of Cloud Computing: Recommendations of the National Institute of Standards and Technology," Special Publication 800-145, Sep. 2011, 7 pages, U.S. Department of Commerce, National Institute of Standards and Technology, Gaithersburg, MD.
Banerjee et al., "Transparent Multi-Architecture Support in a Container Based Cloud", U.S. Appl. No. 14/958,490, filed Dec. 3, 2015.
List of IBM Patents or Patent Applications Treated as Related, dated Jul. 13, 2016, pp. 1-2.

* cited by examiner

TRANSPARENT MULTI-ARCHITECTURE SUPPORT IN A CONTAINER BASED CLOUD

BACKGROUND

Aspects of the present disclosure relate to cloud computing, and more particular aspects relate to multiple-architecture support in cloud computing.

Container technology provides lightweight abstractions for applications including their own file system and network stack. Advancements in container usage model and application development and deployment has made containers a viable alternative deployment model over virtual machine instances. Containers often provide high density of workload instances when compared to virtualization technology since they may share underlying operation system (OS) infrastructure, and may not have a need to run a full OS kernel within each instance.

SUMMARY

According to embodiments of the present disclosure, a method, system, and computer program product are disclosed for supporting multiple architectures in cloud computing. Embodiments of the method, system, and computer program product can include receiving a first input file of a software application, where the software application utilizes a first software architecture. Embodiments may also include analyzing the first input file using static code analysis, where the analyzing includes identifying dependencies for a secondary platform. Embodiments may also include identifying dependencies for the first software architecture based on the analyzing. Embodiments may also include identifying a first set of code transformation rules based on the identified dependencies. Embodiments may also include generating code, based on the first set of transformation rules, and further based on a runtime profile of the first input file, where the runtime profile contains data regarding first characteristics of the first input file with regard to a second software architecture, the generated code allowing the first input file to utilize the second software architecture. Embodiments may also include identifying a second set of code transformation rules based on the identified dependencies. Embodiments may also include generating code, based on the second set of transformation rules, and further based on a runtime profile of the first input file, where the runtime profile contains data regarding second characteristics of the first input file with regard to a third software architecture, the generated code allowing the first input file to utilize the third software architecture. Embodiments may also include determining that the second software architecture is more efficient when running the first input file than the first software architecture. Embodiments may also include determining that the third software architecture is more efficient when running the first input file than the first software architecture. Embodiments may also include determining whether the second software architecture or the third software architecture is more efficient when running the first input file. Embodiments may also include recommending deploying the first input file on the more efficient software architecture in response to the determining which software architecture of the second software architecture and the third software architecture is more efficient when running the first input file. Embodiments may also include analyzing, in response to the first input file being deployed to the second software architecture, the first input file to identify any problems with the first input file as deployed; and identifying problems that may require code changes in order to allow porting of the first input file to the second software architecture. Embodiments may also include the first characteristics having behavior and affinities of the first input file with regard to the second software architecture. Embodiments may also include the second characteristics having behavior and affinities of the first input file with regard to the third software architecture. Embodiments may also include the generating code, based on the first set of transformation rules, the first input file into the second software architecture, and the generating code, based on the second set of transformation rules the first input file into the second software architecture, being performed concurrently.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cloud computing, and more particular aspects relate to multiple-architecture support in cloud computing.

The present disclosure describes various methods and systems for integrated porting of an input file (or application) and deployment of that file on multiple-architecture hardware platforms, including concurrent porting checks on multiple-architecture platform-as-a-service (PaaS), porting recommendations based on static code analysis of applications, and runtime profiling across multiple-architectures for optimization, according to various embodiments.

Container technology in Linux, among other operating systems, provide lightweight abstractions for applications, including their own file system and network stack. Advancements in container usage models and application development and deployment (DevOps) models have made containers an alternative deployment model over virtual machine instances in a cloud, e.g., a PaaS cloud.

Containers, as a technology, are related to virtualization, which has been around for many years. The rapid and open innovation in the industry to simplify consumption of technology at large scale has created new opportunities to create innovative application lifecycle management methods and DevOps workflows. Cloud lifecycle management across heterogeneous hypervisors has been simplified, for example, with OpenStack.

Generally, containers may provide a high density of workload instances when compared to virtualization technology, as they share underlying operation system (OS) infrastructure, like page-caches, IPCs, etc., and may not have a need to run a full OS kernel within each instance.

In a container eco-system, frameworks like Cloud Foundry and Docker enable new DevOps workflow models for application development and deployment in various PaaS cloud environments. For example, a Cloud Foundry deployment model generally uses Docker as a container management framework where Linux containers are basic building blocks. IBM Bluemix, for example, is a product stack that is based on Cloud Foundry and builds on Docker and containers.

In a Cloud Foundry or similar workflow, there exist opportunities to innovate around the multiple-architecture support and related optimizations. Multiple (or, multi) architecture, herein, generally refers to hardware platform or processor architecture like x86, IBM POWER, or ARM, according to various embodiments.

Fundamentally, application (e.g., input files) deployment generally starts with source code and a configuration file. Compilation and deployment and/or recommendations for deployment may be integrated into a workflow. This may provide an opportunity to innovate on multiple-architecture support or transparent porting to multiple platform architectures. Novel extensions to current container-based PaaS workflow are detailed herein and can be implemented in various PaaS workflow tools. Enhancements to Linux tools and administrative software, for example, may be made, according to various embodiments.

Figure 1:
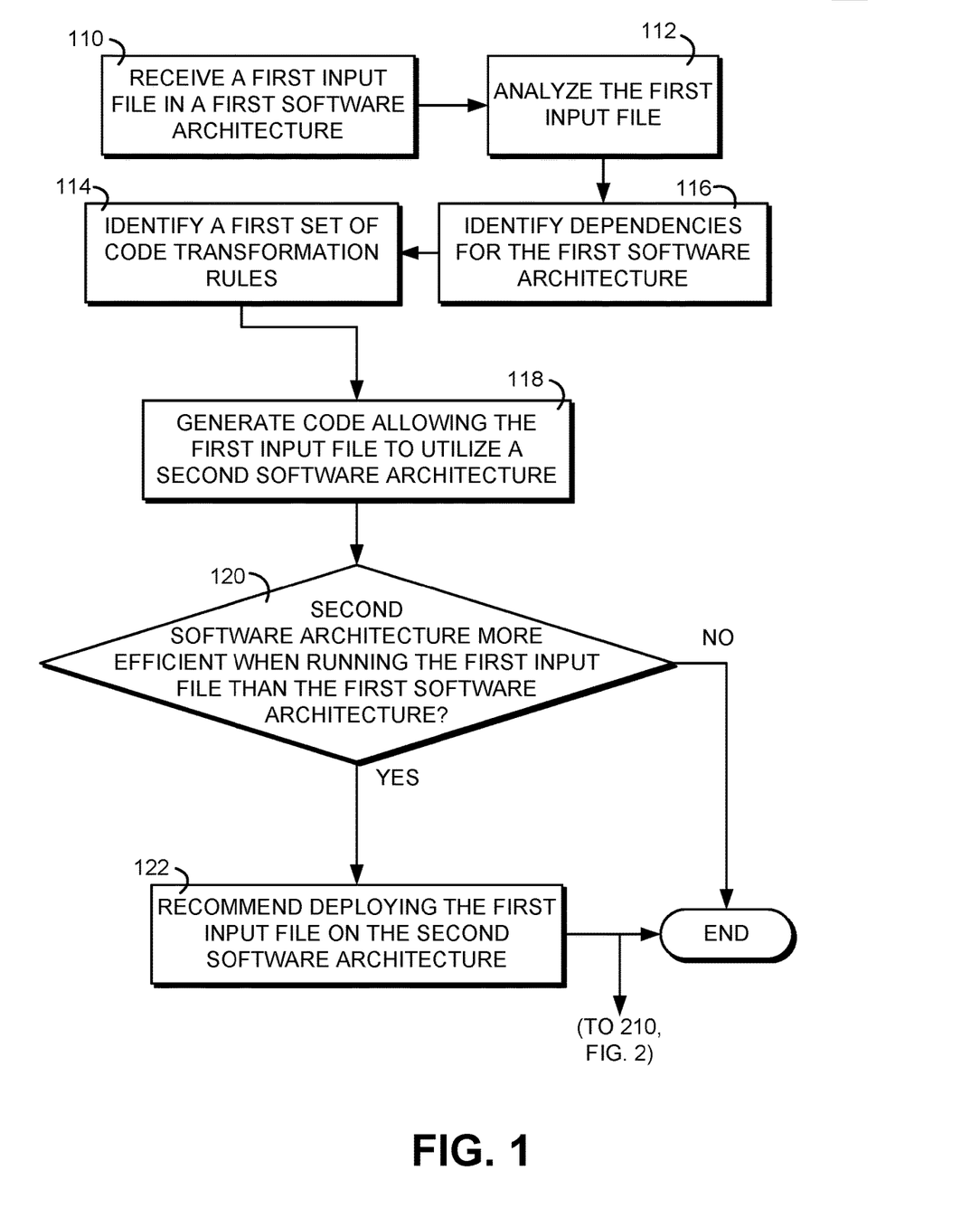
FIG. 1 depicts a flowchart for adjusting runtime performance, according to various embodiments.

FIG. 1 depicts a flowchart for adjusting runtime performance, according to various embodiments.

A process 100 may begin at operation 110, a first input file may be received having a first software architecture when compiled. An application may include the input file when compiled, according to various embodiments, and the input file may be composed of code.

At operation 112 the first input file, may be analyzed, for example, through static code analysis or dynamic code analysis. The first input may be analyzed before or after being compiled at operation 112, according to various embodiments. At operation 114, a first set of code transformation rules may be identified and/or generated based on the analysis of the first input file at operation 112. At operation 116, any dependencies for the first software architecture may be identified. Dependencies for the first software architecture may be identified by receiving a configuration or description file along with input source code to compile, recommend for deployment, and deploy the application automatically, according to various embodiments. Dependencies may be determined prior to operation 114, according to various embodiments. At operation 118, code may be generated that allows the first input file to utilize a second software architecture. Operation 118 may represent porting, according to various embodiments.

At operation 120, it may be determined whether the second software architecture is more efficient when running the first input file than the first software architecture. Efficiency may be defined as the ability to run an input file or application quickly or running the input file with a minimum of problems, such as bugs or failures. If it is determined that the second software architecture is not more efficient than the first software architecture when running the first input file, the process may end.

If it is determined that the second software architecture is more efficient than the first software architecture when running the first input file, the first input file may be recommended to be deployed on the second software architecture at operation 122. The process may then end, or may proceed to operation 210 of FIG. 2.

Figure 2:
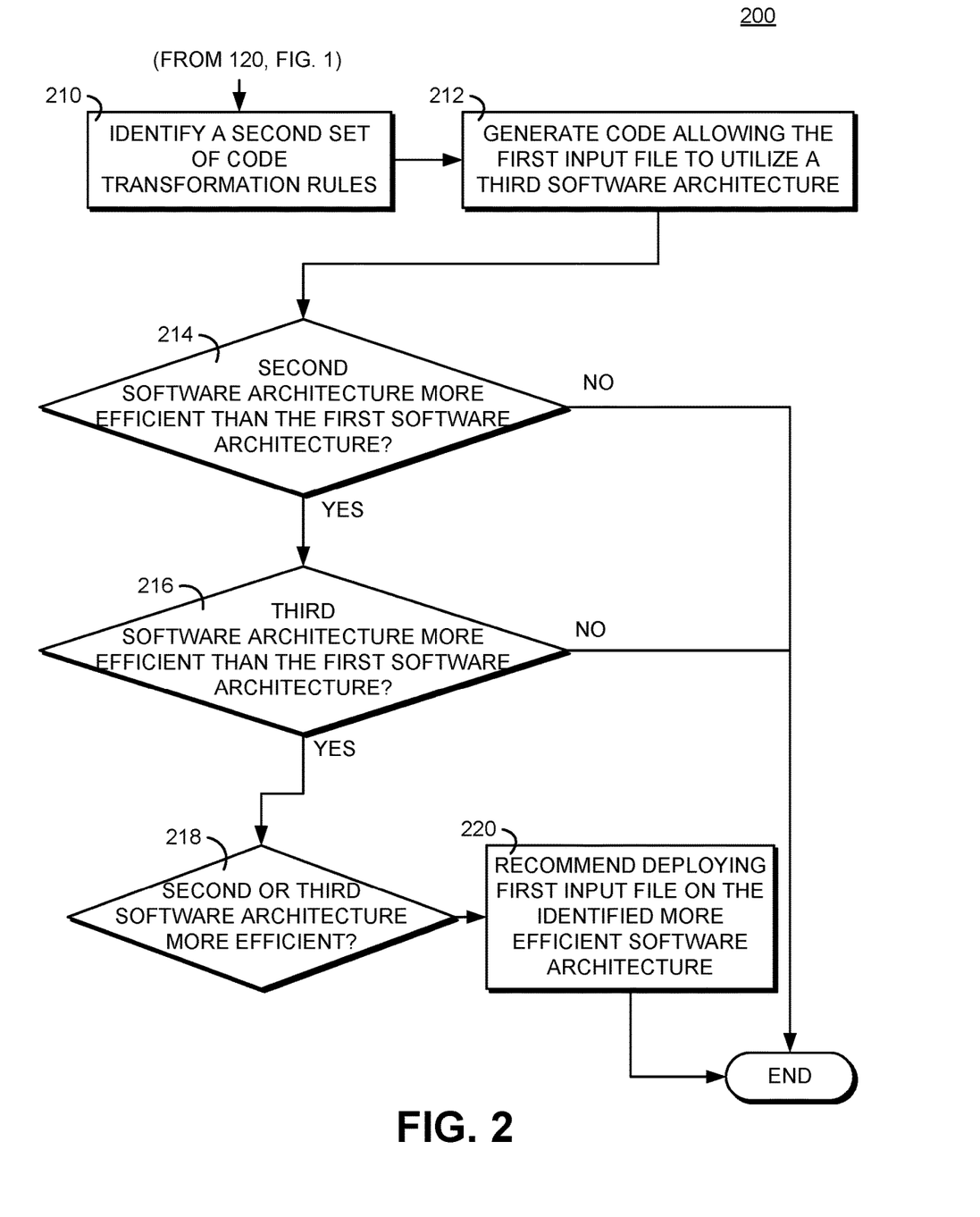
FIG. 2 depicts a flowchart for adjusting runtime performance, according to various embodiments.

FIG. 2 depicts a flowchart for adjusting runtime performance, according to various embodiments.

A process 200 may begin at operation 210, where a second set of code transformation rules may be generated. Process 200 may begin following operation 120 of FIG. 1.

At operation 212, code may be generated to allow the first input file, once compiled, to utilize a third software architecture. At operation 214, it may be determined whether the second software architecture is more efficient when running the first input file than the first software architecture. If the second software architecture is not more efficient than the first software architecture, the process may end.

If it is determined that the second software is more efficient than the first software architecture when running the first input file, the process may proceed to operation 216. At operation 216, it may be determined whether the third software architecture is more efficient than the first software architecture when running the first input file. If the third software architecture is not more efficient than the first, then the process may end. If the third software architecture is determined to be more efficient than the first software architecture when running the first input file, the process may proceed to operation 218.

At operation 218, it may be determined whether the second software architecture or the third software architecture is the more efficient. Based on the determination of operation 218, the first input file may be recommended to be deployed on the more efficient of the software architectures at operation 220. The process may then end.

Figure 3:
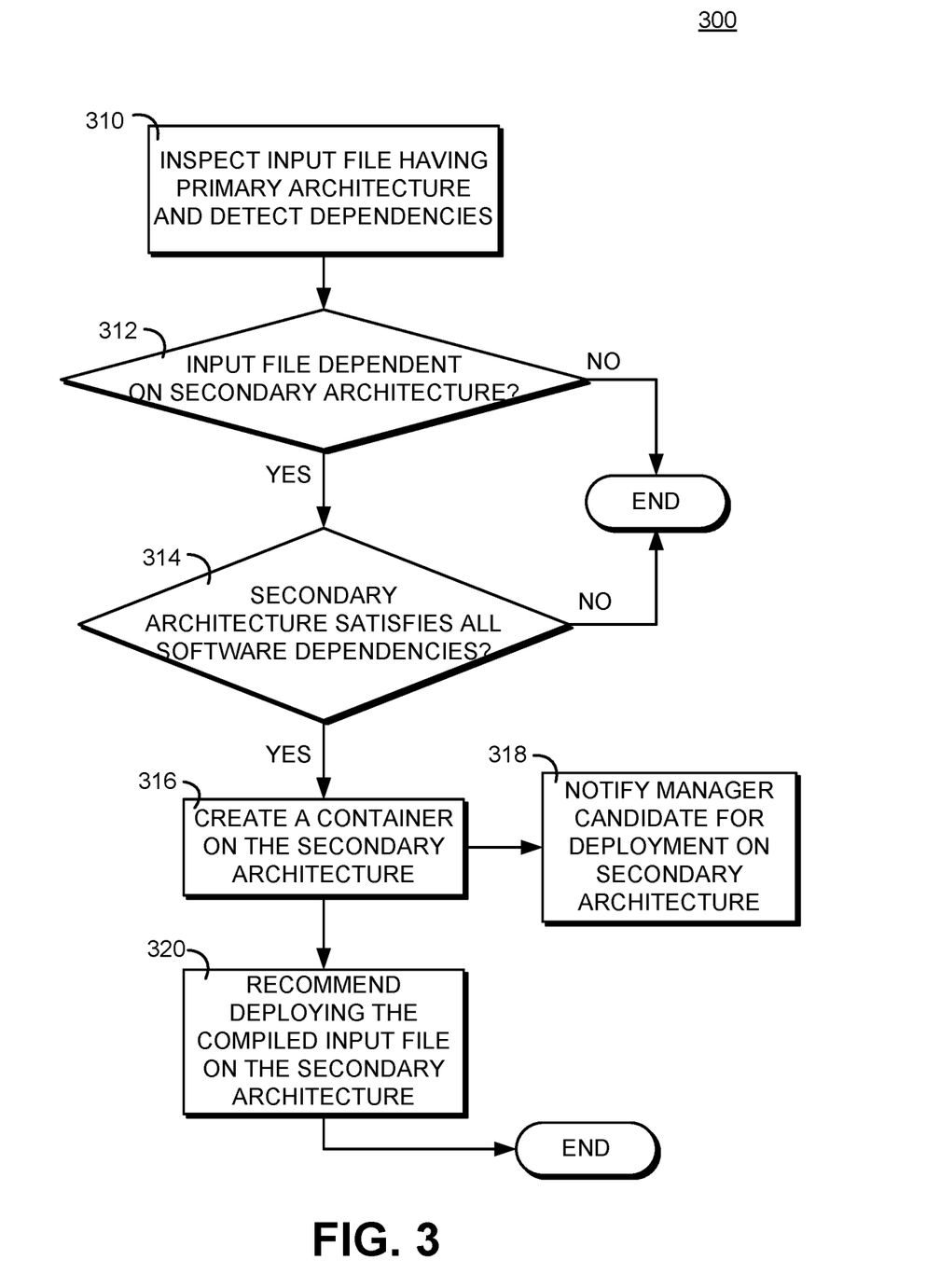
FIG. 3 depicts a flowchart for adjusting runtime performance when an application is portable, according to various embodiments.

FIG. 3 depicts a flowchart for adjusting runtime performance when an application is portable, according to various embodiments. According to various embodiments, FIG. 3 may depict a case when an application is completely (e.g., directly) portable.

A container may be created on the secondary platform, and the application may be deployed on multiple architectures. This deployment may be transparent to an end user, according to various embodiments.

A process 300 may begin at operation 310, a input file having a primary software architecture may be compiled, deployed, and/or inspected in order to detect various dependencies. Operation 310 may include inspecting application source code and detecting dependencies for a primary software architecture (e.g., an x86 platform).

At operation 312, it may be determined whether the input file is dependent on a secondary architecture. An example of a secondary architecture may include an IBM Power platform, according to various embodiments. If the input file is not dependent on a second architecture, the process may end.

If the input file is compatible with the secondary architecture, then it may be checked whether all dependency are satisfied and proceed. Alternatively, it may be determined whether the input file is fully independent on the primary architecture. According to various embodiments, the process may continue to operation 314 if the answer is yes. If the input file does not satisfy the dependency on the secondary architecture, then the process may stop. If the application depends on any other library and/or files that need to be satisfied or resolved in the secondary architecture, then the application may not be deployed or recommended for deployment. For example, a Java application may easily run on primary or secondary architecture, but all its dependencies like class libraries may need to be satisfied on the secondary architecture. However, if the input file or application code itself is platform independent, it may run on primary or secondary architecture, according to various embodiments.

If the input file is dependent on a secondary architecture, it may be determined whether the secondary architecture satisfies all software dependencies at operation 314. If the secondary architecture does not satisfy all the software dependencies, the process may end.

If the secondary architecture satisfies all software dependencies, the process may proceed to operation 316. At operation 316, a container may be created on the secondary architecture. In response to operation 316, a manager may be notified that the input file, once compiled, is a candidate for deployment to the secondary architecture at operation 318. At operation 318 the manager may be a PaaS manager, according to various embodiments. For example, a Java application may be completely portable, and the porting may occur transparently. If the secondary architecture satisfies all software dependencies, it may run compiled input file (application) on the secondary platform-based server. This may represent a relatively simple scenario, according to various embodiments. Following operation 316, the compiled input file may be recommended for deployment and/or deployed to the secondary architecture at operation 320, according to various embodiments. The process may then end.

Figure 4:
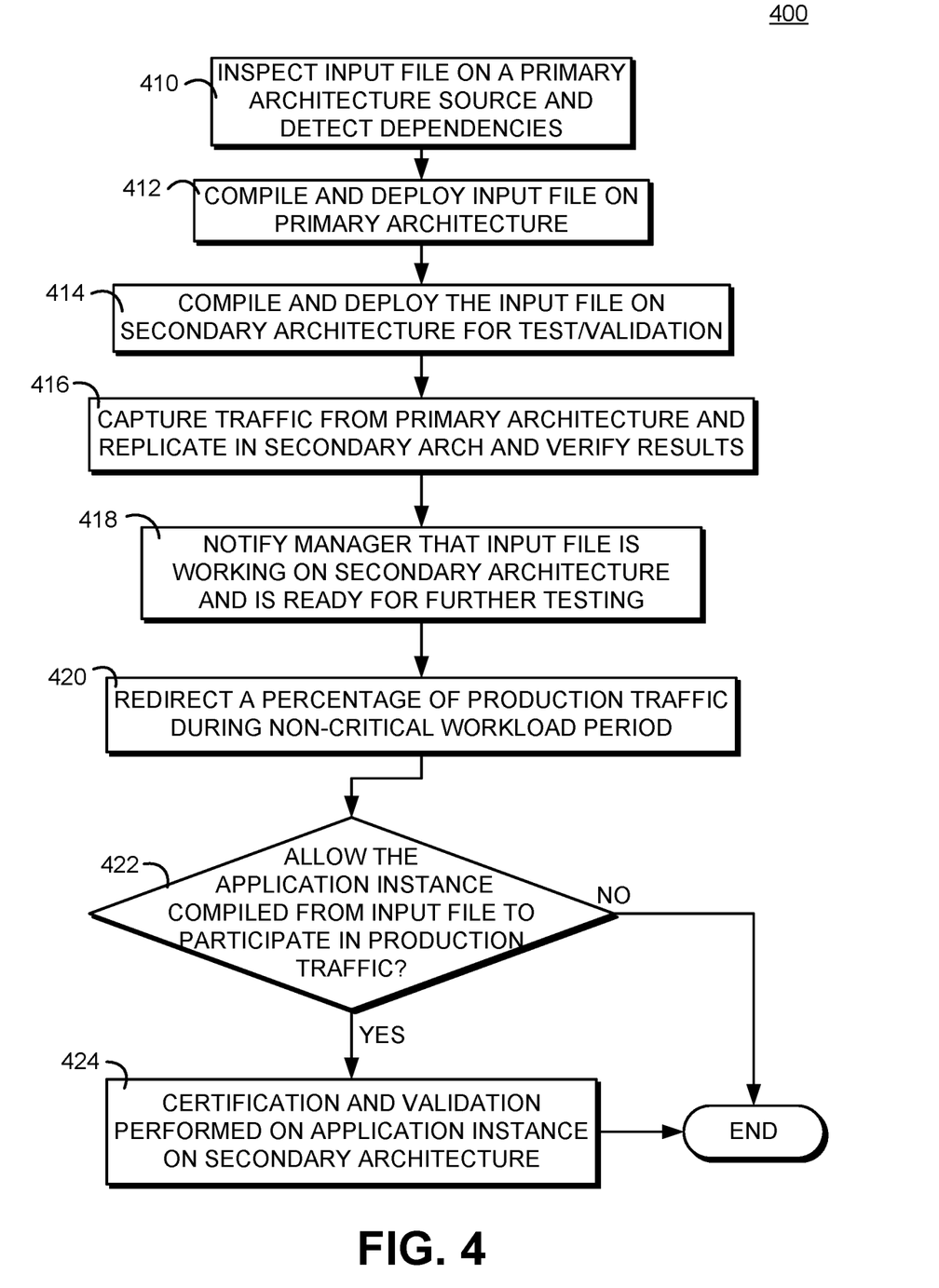
FIG. 4 depicts a flowchart for adjusting runtime performance when an application is portable, according to various embodiments.

FIG. 4 depicts a flowchart for adjusting runtime performance when an application is portable, according to various embodiments. According to various embodiments, FIG. 4 may depict a case when a portability check for an application is non-trivial.

The portability check may not be trivial, and concurrent porting check on multiple-architecture PaaS may be efficient. The concurrent porting check may include inspecting application source and configuration file to detect dependencies. If the portability check for other architectures are not conclusive at operation 314 of FIG. 3, the application may be recommended for deployment and/or deployed on a primary platform (e.g., x86). The application, in another architecture may be concurrently compiled and/or deployed for testing or validation. For example, an application may be deployed on an IBM Power-based host in a controlled test environment for testing purposes.

Traffic or activity data from a primary container (architecture) may be captured and replicated to another test container on a secondary platform, (e.g., a Power system) and the results may be verified or analyzed, for the purposes of comparison, according to various embodiments. The verification or analysis may be runtime validation, conducted with a sample of real production workload traffic.

A process 400 may begin at operation 410, an input file on a first architecture may be inspected in order to detect any dependencies the input file may have, before or after the input file is compiled, if at all. At operation 412, the input file may be compiled and deployed on the primary architecture, unless it has already been previously deployed to the primary architecture. At operation 414, the input file may be compiled and/or deployed on a secondary architecture for testing and/or validation.

At operation 416, the traffic resulting from the compiled input file on the primary architecture may be replicated (e.g., by copying) in the secondary architecture and the results may be tested and/or verified, according to various embodiments. At operation 418, a manager may be notified that the compiled input file is working on the secondary architecture and that the input file is ready for further testing. A compiled input file may be working if the compiled file is executed as an application without the detection of bugs or other problems, or otherwise fails to properly execute. Further testing may include more rigorous testing, according to various embodiments.

At operation 420, a percentage of the production traffic may be redirected to the secondary architecture during a non-critical workload period, according to various embodiments. A non-critical workload period may include a period in which a processor or processing node is not fully utilized or has remaining resources that can be utilized without having a negative impact on performance. Operation 420 may be in response to a manager choosing to redirect a pre-configured small percentage of production traffic during non-critical workload period. This may allow an application instance to participate in production traffic as additional instance.

At operation 422, it may be determined whether to allow the application instance compiled from the input file to participate in production traffic as assistance. If it is determined not to allow the application instance to participate in production traffic as assistance, the process may end. If it is determined that the application instance compiled from the input file is allowed to participate in production traffic as assistance, the process may continue to operation 424. At operation 424, the application instance may have certification and validation performed on it within the secondary architecture. Based on various results, the manager may freely recommend for deployment and/or deploy or scale on multiple architectures in future. The process may then end.

Figure 5:
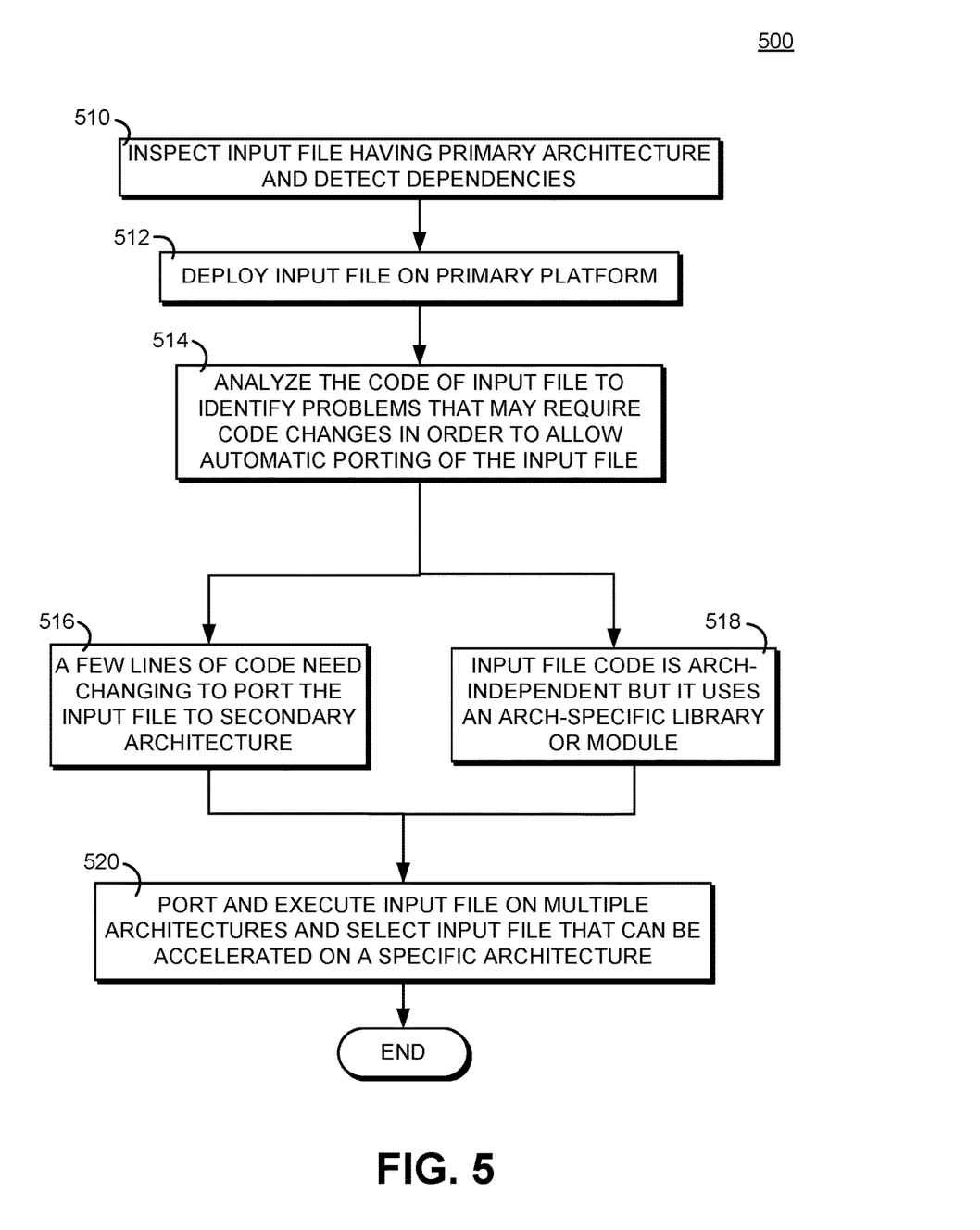
FIG. 5 depicts a flowchart for adjusting runtime performance when an application fails to port automatically, according to various embodiments.

FIG. 5 depicts a flowchart for adjusting runtime performance when an application fails to port automatically, according to various embodiments. According to various embodiments, FIG. 5 may depict a case when an automated porting attempt fails.

A process 500 may begin at operation 510, an input file having a primary architecture may be compiled. The input file may be inspected and dependencies may be detected. At operation 512, the input file may be compiled and may be recommended for deployment and/or deployed on a primary platform if it has not already been deployed on the primary platform.

At operation 514, the code of the input file may be analyzed to identify and list problems that may require code changes in order to allow automatic, direct, transparent, or other porting of the input file to another architecture. Porting recommendation may be based on static code analysis of code in the input file, whether compiled or not.

Operations 516 and 518 represent possible alternative scenarios, based on the analyzing the code of the input file at operation 514. Operations 516 and/or 518 may require manual intervention to resolve various problems. For example, an automatic algorithm may be unable to proceed and may require a user to modify the input file, and other methods as described herein may be utilized. According to various embodiments, static code analysis tools, coupled with runtime behavior on the primary platform (if required) can provide various recommendations According to operation 516, a few lines of code may need changing to port the input file to the secondary architecture. Alternatively, at operation 518, the input file code may be architecture independent, but the input file may use an architecture-specific library and/or module, according to various embodiments. In this case, a similar library on other architectures or usage of a platform independent library or module can be recommended.

After a determination as to the nature of the code of the input file at operations 514-518, the input file may be ported and executed on multiple architectures at operation 520, and an input file may be selected that can be accelerated on a specific architecture when compiled, according to various embodiments. The process may then end.

Figure 6:
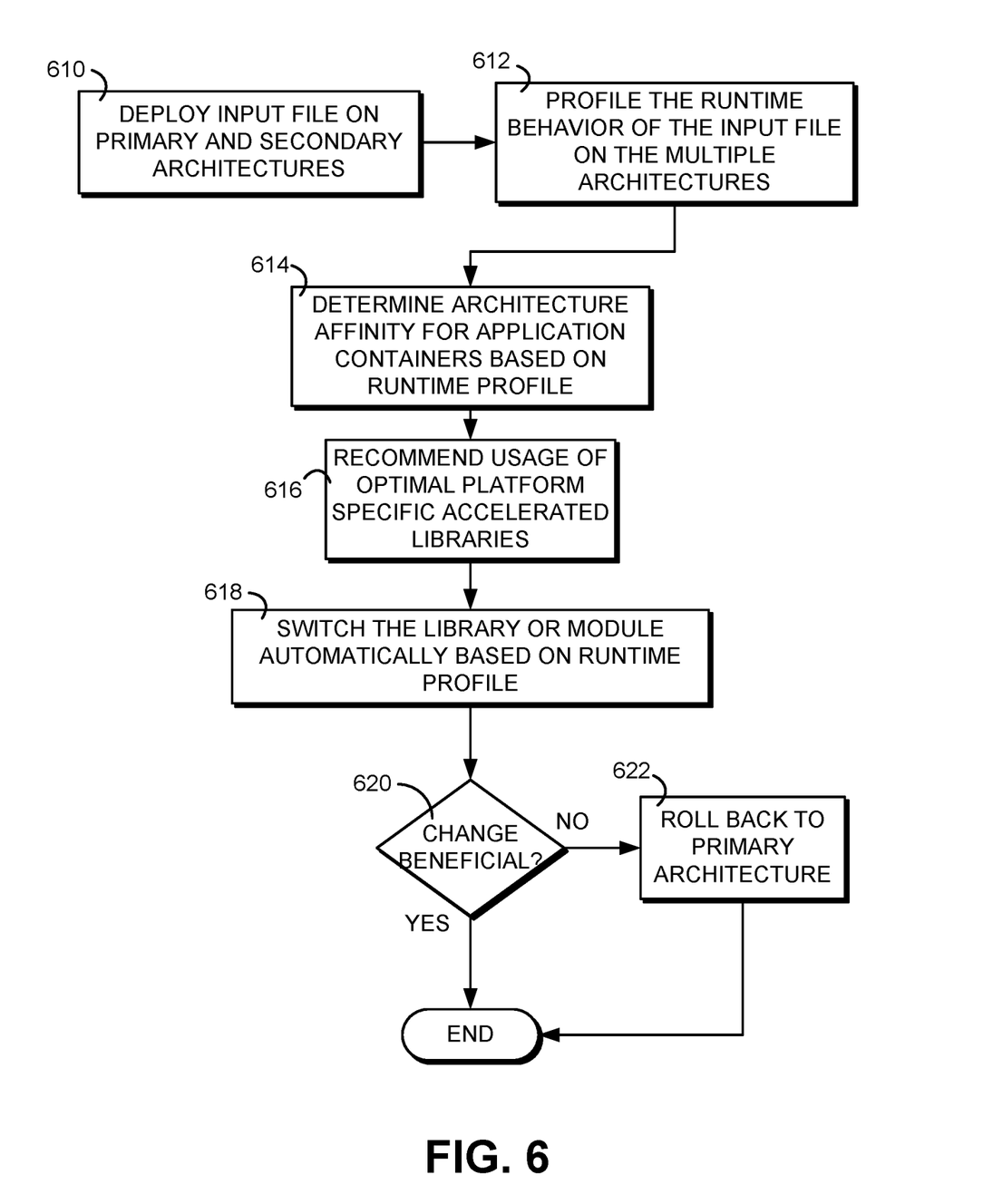
FIG. 6 depicts a flowchart for adjusting runtime performance, according to various embodiments.

FIG. 6 depicts a flowchart for adjusting runtime performance, according to various embodiments. According to various embodiments, FIG. 6 may depict a case when an application is analyzed for runtime optimization.

A process 600 may begin at operation 610, where an input file may be compiled and may be recommended for deployment and/or deployed on primary and secondary architectures.

At operation 612, the runtime behavior of the compiled input file on the primary and secondary architectures may be profiled, e.g., for analysis. The profiling of operation 612 may include profiling the runtime behavior of the application on multiple (e.g., primary and secondary) architectures to analyze the nature of the workload, according to various metrics. Various profiling data points may involve memory bandwidth requirements, vector computation usage, common tasks that can be accelerated on various architectures (e.g., IBM Power) like cryptography or compression, key security requirements like random number entropy, and so forth.

At operation 614, affinities for architectures or platforms may be determined or derived for application containers based on the runtime profile, which may include characteristics of the input file. The runtime profile may contain data regarding characteristics of the compiled input file with regard to a first, second, and/or third software architecture, the generated code allowing the first input file to utilize the respective software architecture. Application containers may contain the input file, according to various embodiments.

At operation 616, an optimal platform for specific accelerated libraries and/or modules may be determined and recommended, based on the characteristics included in the runtime profile. Usage or implementation of one or more optimal platform-specific accelerated libraries to an input file can be recommended to the developer, according to various embodiments. For a transparent replacement, the library or module can be switched automatically based on various runtime profile results. Runtime optimization on multiple architectures may include an input file (e.g., which may compose an application to be executed when compiled) being ported and executed on multiple architectures. Generally, the application that can be accelerated on a specific architecture for better performance and density may be selected.

At operation 618, a library or module may be switched automatically based on the runtime profile, especially if transparent. The runtime profile may include characteristics of the input file and/or the nature of running the input file on a software architecture, according to various embodiments.

At operation 620, it may be determined if the change that took place at operation 618 was beneficial to performance of the input file. If the change was not beneficial, the architecture may be rolled back to the primary architecture at operation 622 and the process may end. To test whether a change is beneficial, the ported or transformed application may be tested by capture and replay of traffic, in the form of test cases, according to various embodiments. A cloud or container manager (e.g., an agent) may be informed on various progress, for instance, if porting was successful. In this case, the architecture that provided best performance may be used by a larger cloud data center operation, according to various embodiments.

If the change was beneficial, the compiled input file may remain on the secondary architecture and the process may end.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the computing resources of the provider are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in various quantities at various times.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software-as-a-Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform-as-a-Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure-as-a-Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (e.g., private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 7:
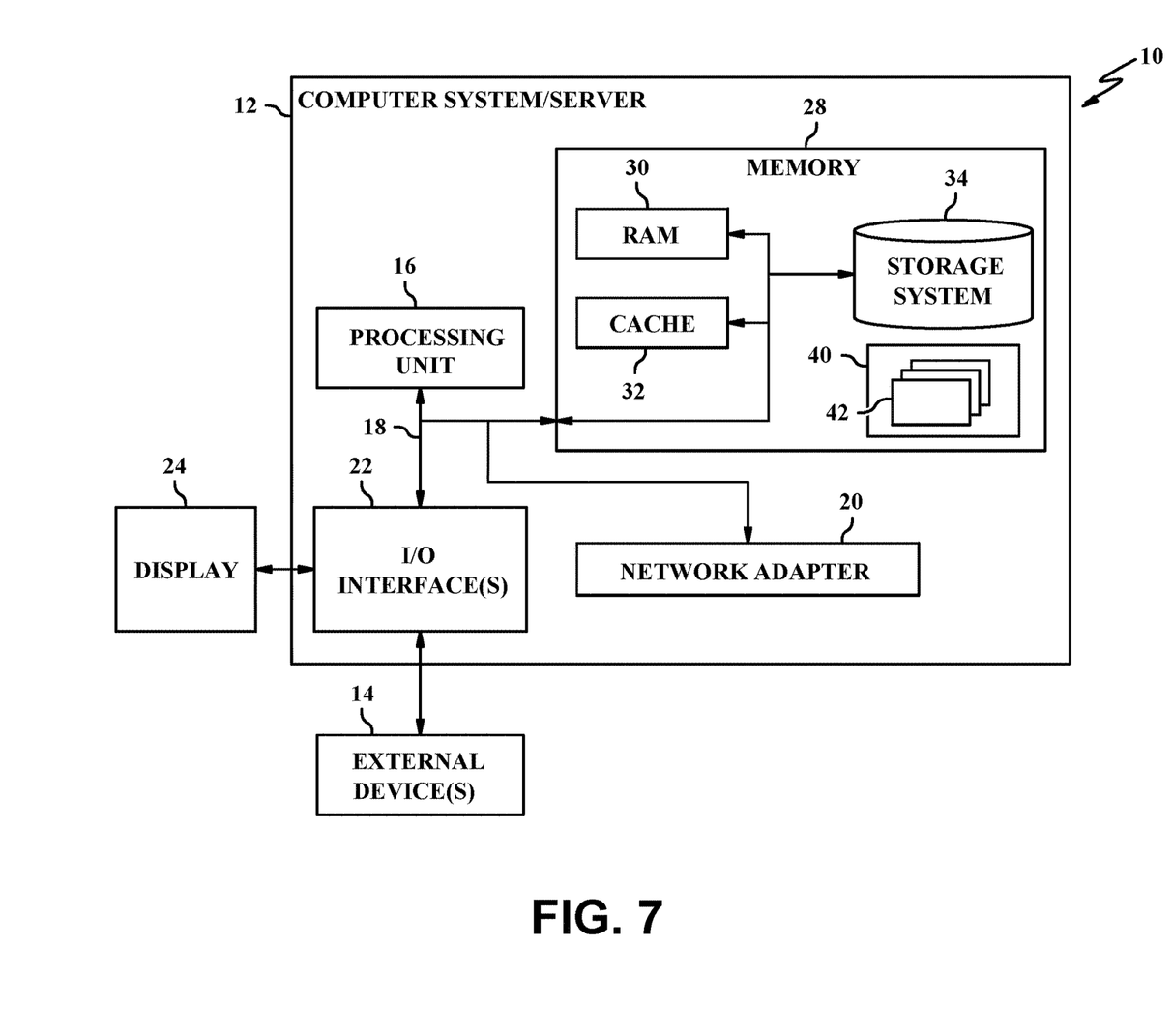
FIG. 7 depicts a cloud computing node, according to various embodiments.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
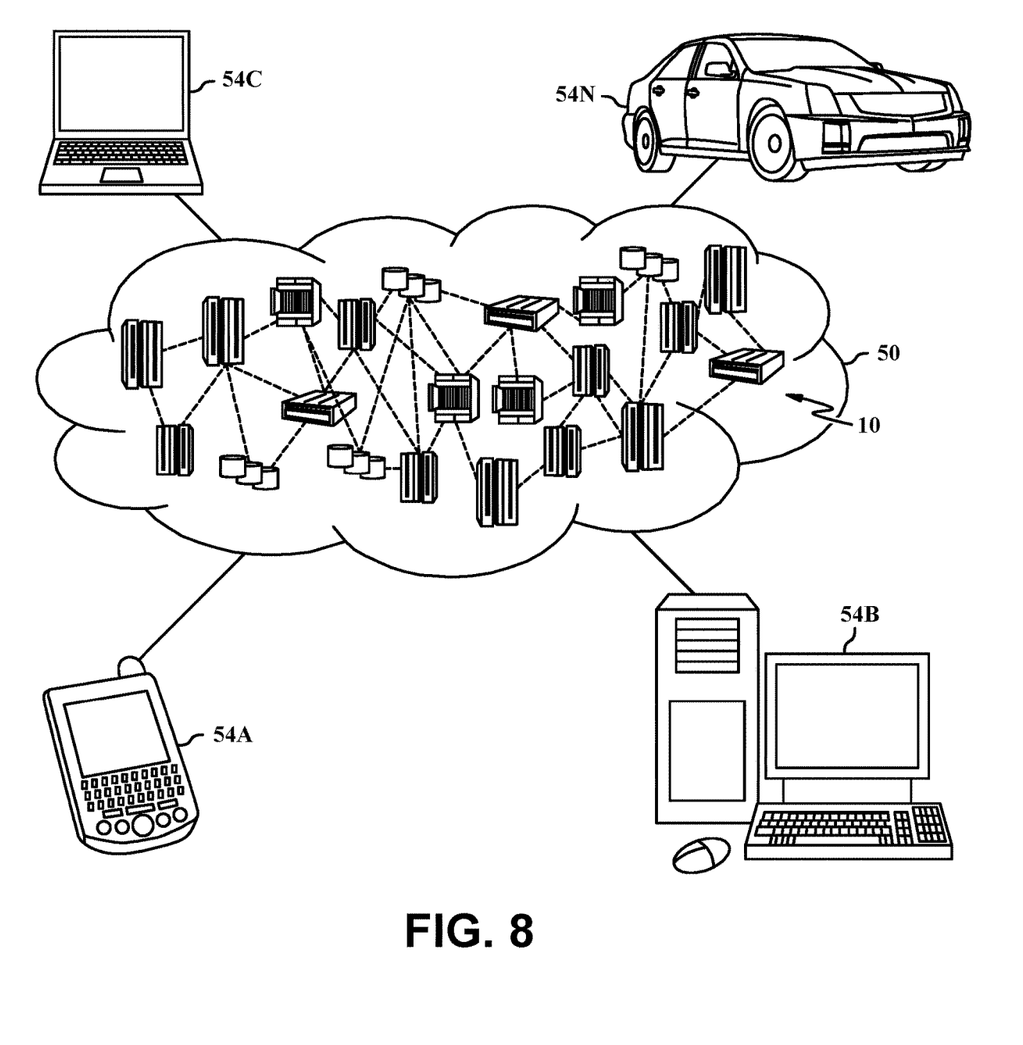
FIG. 8 depicts a cloud computing environment, according to various embodiments.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
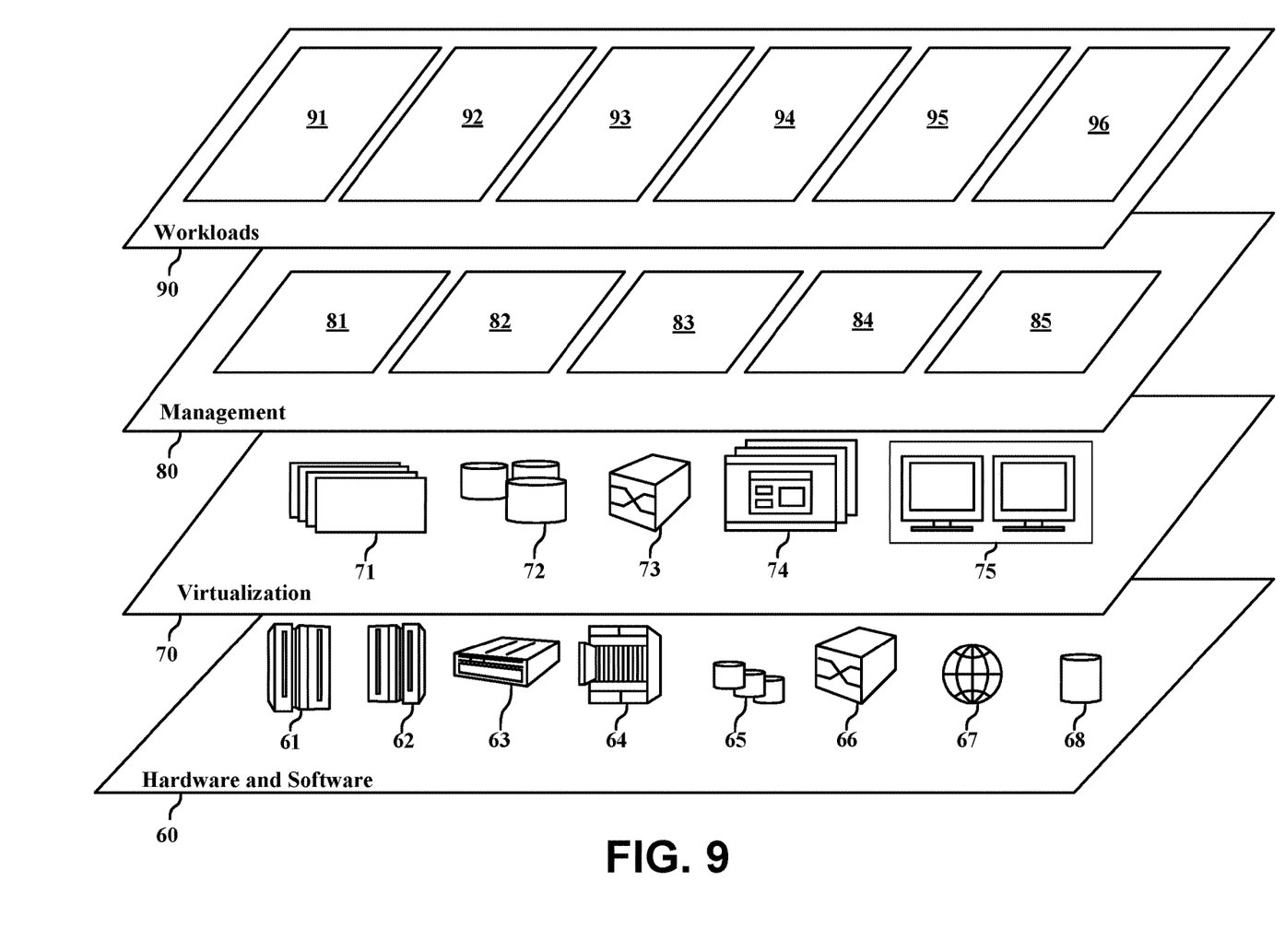
FIG. 9 depicts abstraction model layers, according to various embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions, which may be provided from this layer, include mapping and navigation 91; software development and lifecycle management 92; virtual classroom education delivery 93; data analytics processing 94; transaction processing 95; and mobile desktops 96.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for adjusting runtime performance, comprising:

receiving an input file containing source code of a software application, wherein the software application utilizes a software architecture that is selected from the group consisting of a first software architecture and a second software architecture that is different from the first architecture;

analyzing the input file using static code analysis, wherein the input file may be compiled, deployed, and inspected in order to detect various dependencies for the software architecture;

identifying first dependencies for the first software architecture and second dependencies for the second software architecture based on the analyzing, wherein each of the first and second dependencies is a feature of the software architecture required by the input file to enable the input file, once compiled, to utilize the software architecture, when the input file is determined to be architecture independent for the first and second software architectures based on the identifying, then determining to use an architecture-specific library or module, and, responsive to this determination, determining the architecture-specific library or module to utilize for the first software architecture and the second software architecture selected from the group consisting of: a) a first library or module of the first software architecture and a second library or module of the second software architecture, and b) a platform independent library or module;

identifying a first and second set of code transformation rules based on the respective first and second identified dependencies;

generating first code by compiling the input file based on the first set of code transformation rules, if the first architecture satisfies the first identified dependencies, a first container is created, wherein the generated first code allows the input file to run on the first software architecture;

generating second code for the input file based on the second set of code transformation rules, if the second architecture satisfies the second identified dependencies, a second container is created, wherein the generated second code allows the input file to run on the second software architecture;

profiling the first code while it is running in the first container utilizing the first software architecture to produce first results and a runtime profile containing data regarding characteristics of the input file, wherein:
- the characteristics are selected from the group consisting of: memory bandwidth, vector computation, cryptography, compression, and random number entropy; and
- the characteristics that are in the runtime profile and used to determine at least one of specific accelerated libraries or modules include behavior and affinities of the input file with regard to the second software architecture;

the method further comprising:

profiling the second code while it is running in the second container concurrently with the first code running in the first container, the second code utilizing the second software architecture to produce second results while concurrently utilizing traffic or activity data captured and replicated from the first container of the first software architecture;

verifying the second results of the second code with the first results of the first code based on the captured traffic or activity data;

determining that the first or second code running on the corresponding software architecture is most efficient based on the verifying wherein said most efficient is running quicker and with fewer problems;

recommending the input file to be deployed on the determined software architecture; and deploying the input file on the most efficient software architecture using the generated code.

2. The method of claim 1, further comprising:

determining that the input file, in response to the analyzing the input file using static code analysis, can be directly ported from the first software architecture to the second software architecture; and generating code allowing the input file to utilize the second software architecture, wherein the input file is directly ported from the first software architecture to the second software architecture.

3. The method of claim 1, further comprising:

analyzing, in response to the input file being deployed to the second software architecture, the input file to identify any problems with the input file as deployed; and identifying problems that may require code changes in order to allow porting of the input file to the second software architecture.

4. The method of claim 1, wherein the software application comprises an application code and the input file comprises a portion of the application code.

* * * * *